(12) United States Patent
Lai et al.

(10) Patent No.: US 6,537,081 B2
(45) Date of Patent: Mar. 25, 2003

(54) ARRANGEMENT FOR PROVIDING A SELECTABLE EXPANSION ADAPTER ON ELECTRONIC DEVICE

(75) Inventors: Cheng-Shing Lai, Taipei Hsieng (TW); Yun Gu, Nanking (CN)

(73) Assignee: Inventec Appliances Corporation, Taipei Hsieng (TW)

(*) Notice: Subject to any disclaimer, the term of this patent is extended or adjusted under 35 U.S.C. 154(b) by 0 days.

(21) Appl. No.: 09/912,297

(22) Filed: Jul. 26, 2001

(65) Prior Publication Data

US 2003/0022531 A1 Jan. 30, 2003

(51) Int. Cl.⁷ .............................................. H01R 12/00
(52) U.S. Cl. ........................ 439/66; 439/500; 439/660; 429/123
(58) Field of Search ........................ 439/66, 76.1, 218, 439/500, 550, 630, 638, 660, 862; 429/123

(56) References Cited

U.S. PATENT DOCUMENTS 4,515,872 A * 5/1985 Okano ......................... 439/65
6,244,894 B1 * 6/2001 Miyashite .................... 439/500
6,319,053 B1 * 11/2001 Andrews et al. ............ 439/500
6,171,138 B1 * 1/2002 Lefebvre et al. ............ 439/500
6,179,649 B1 * 1/2002 An .............................. 439/500

* cited by examiner

Primary Examiner—Tho D. Ta
Assistant Examiner—Larisa Tsukerman
(74) Attorney, Agent, or Firm—Bacon & Thomas

(57) ABSTRACT

An arrangement for providing a selectable expansion adapter on an electronic device is provided. In use, the adapter is inserted into and electrically coupled to the battery which is in turn inserted into a recess on the back of the device wherein the terminals of the adapter is coupled to connector of the battery and the battery together with the adapter are inserted into the recess with the connector coupled to circuit board of the device, thereby transmitting signals between the adapter and the device and storing data in the adapter. There is no sacrifice of precious space of the device with the additional memory of adapter added into. Hence, a slim electronic device is achievable. Further, there is no modification to the current construction of the device.

2 Claims, 2 Drawing Sheets

ARRANGEMENT FOR PROVIDING A SELECTABLE EXPANSION ADAPTER ON ELECTRONIC DEVICE

FIELD OF THE INVENTION

The present invention relates to the field of intelligent mobile phones and more particularly to an arrangement for providing a selectable expansion adapter on an electronic device such as an intelligent mobile phone.

BACKGROUND OF THE INVENTION

Message communication has become more rapid and frequent in this e-generation. Further, electronic devices, and particularly portable electronic devices have been widely used in various trades and in our daily life as an indispensable means. Moreover, nowadays more features are added by manufacturers to portable electronic devices such as intelligent mobile phones. For example, there is available intelligent mobile phones equipped with a Global Positioning System (GPS) and a card storage means, a Motion Picture Coding Expert Group Audio Layer-3 (MP3), or a camera. Typically, a high-capacity memory for storing data is provided in such an electronic device. Such expanded memory is typically in the form of an expansion adapter. A security digital (SD) adapter is one of the most popular expansion adapters.

Conventionally, a unique SD recess is required to be provided on the electronic device for receiving the SD adapter. Typically, there are two techniques for installing the SD adapter. One is to weld the SD adapter on a circuit board of the electronic device. This technique is disadvantageous because it results in a bulky electronic device. This, in turn, increases the weight of portable electronic device since the SD adapter is secured to the electronic device and the SD recess. Such lack of adaptability really bothers users. The other technique is effected by providing an accessory in which an SD recess is provided, the accessory being releasably installed on an electronic device so as to establish an electrical connection between input/output (I/O) ports of the SD recess and that of the electronic device to which the accessory is connected. In use, the user simply inserts SD adapter in the SD recess on the accessory prior to inserting the accessory in the electronic device. This is disadvantageous because accessory with the inserted SD recess is a detachable device, resulting in inconvenience to use. Even worse, the accessory and electronic device are subject to damage due to frequent insertion and disassembly. Thus, it is desirable to provide a novel arrangement on an electronic device in order to overcome the above drawbacks of the prior art.

SUMMARY OF THE INVENTION

It is therefore an object of the present invention to provide an arrangement for providing a selectable expansion adapter on an electronic device that includes a recess on the back of the electronic device having an opening; a circuit board in the electronic device having a plurality of terminals projected from the opening; and a battery shaped to be capable of insertion into the recess. The battery includes a slot on one side for receiving a detachable expansion adapter having a plurality of terminals on one side and a connector extended from inside the slot to project from the surface of the battery. During use, the expansion adapter is inserted into the slot with the terminals of the expansion adapter coupled to the connector, and the battery together with the expansion adapter are inserted into the recess with the connector electrically coupled to the terminals of the circuit board, thereby transmitting signals between the expansion adapter and the electronic device and storing data in the expansion adapter. The advantageous benefits of the invention are as follows. There is no sacrifice of precious space in the device with the additional memory of adapter added into. Hence, a slim electronic device is achievable. Further, there is no modification to the current construction of the device. Furthermore, the device may interchangeably use both a conventional battery and the battery of the invention. Thus it enables user selection of the device.

The above and other objects, features and advantages of the present invention will become apparent from the following detailed description taken with the accompanying drawings.

DETAILED DESCRIPTION OF THE PREFERRED EMBODIMENTS

Recently, more additional features are incorporated into portable electronic devices such as intelligent mobile phones. In response, a high-capacity memory for storing data related to the implementation of above feature is provided in such electronic devices. Such expanded memory is typically in the form of expansion adapter. A security digital (SD) adapter is one of the most popular expansion adapters. Accordingly, the invention is aimed at providing a unique arrangement for mounting a selectable expansion adapter on such an electronic device.

Figure 1:
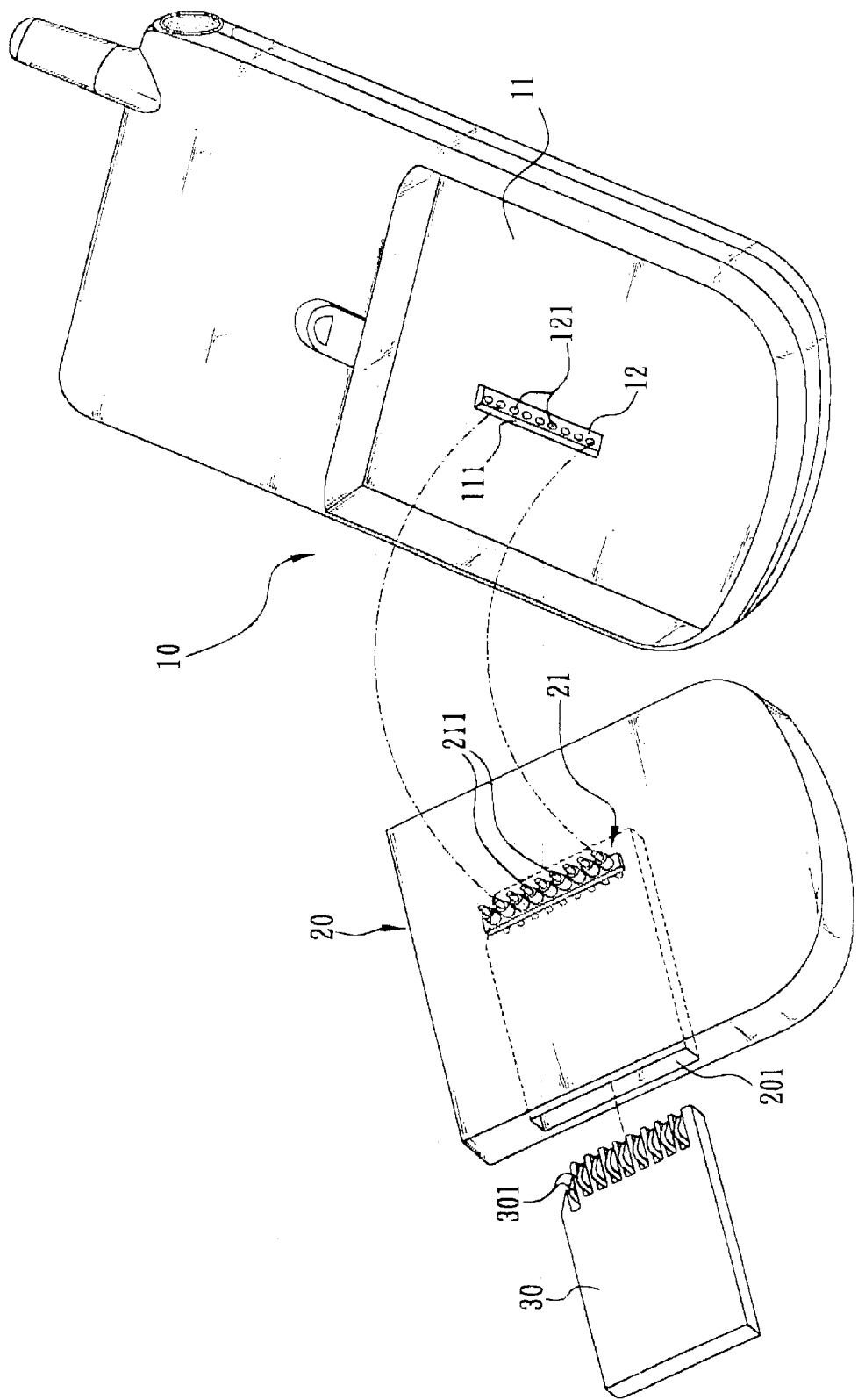
FIG. 1 is an exploded perspective view showing an arrangement according to the invention for providing a selectable expansion adapter on an electronic device.
Figure 2:
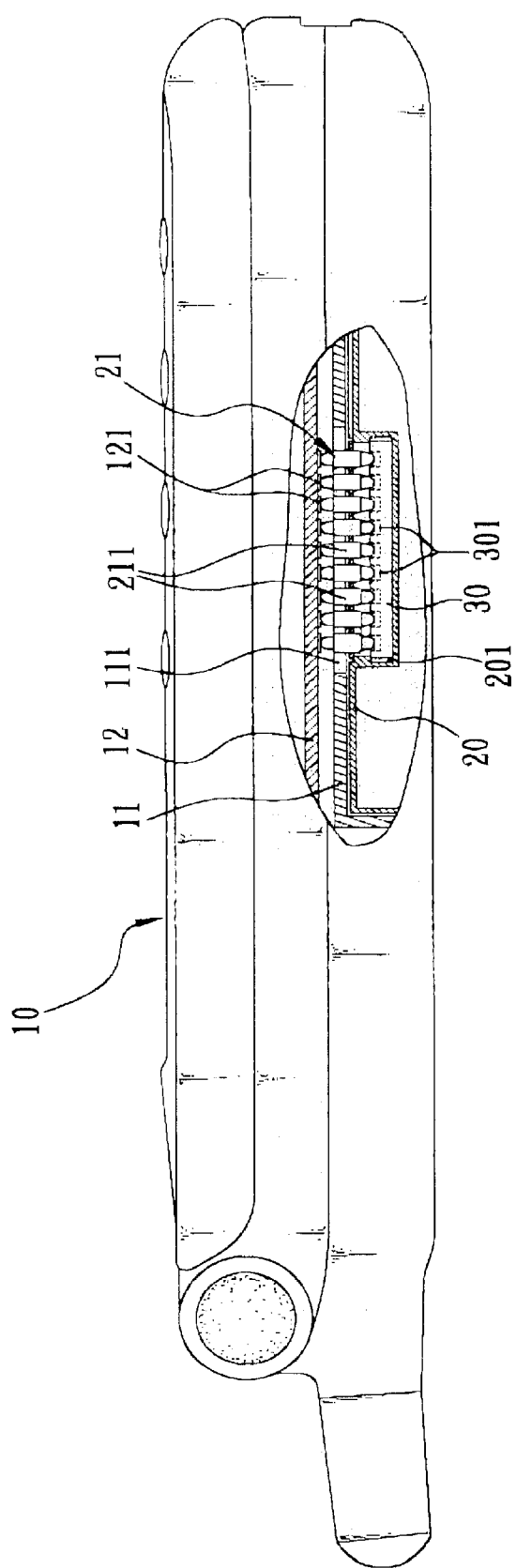
FIG. 2 is a side view in partial cross-section of the arrangement of FIG. 1.

Referring to FIGS. 1 and 2, the configuration of the invention will now be described. As shown, electronic device 10 comprises a recess 11 on the back having an opening 111 and an internal circuit board 12 having a plurality of terminals 121 projected from the opening 111. A battery 20 is shaped to be capable of insertion into recess 11 and comprises a slot 201 on one side and a connector 21 extended from the bottom of slot 201 to project on the surface of battery 20. An SD adapter 30 has a plurality of terminals 301 projected on one side. In use, the SD adapter 30 is inserted into slot 201 with terminals 301 coupled to connector 21. Battery 20 is then inserted together with SD adapter 30 into recess 11 with the terminals of connector 21 electrically coupled to terminals 121 of circuit board 12. Note that it is also possible to insert a conventional battery into recess 11 when battery of the invention is not required in a typical use of electronic device 10. Thus, the invention is highly adaptable. Moreover, connector 21 comprises a plurality of flexible pegs 211 having one end inserted into hole-shaped terminals 121 of circuit board 12 to be secured therein. Also, the other ends of the flexible pegs 211 of connector 21 are biased by insertion of SD adapter 30 to be secured to terminals 301. With such electrical connection between SD adapter 30 and circuit board 12, it is to transmit signals therebetween and store data in SD adapter 30.

In brief, SD adapter 30 is inserted during use into slot 201 of battery 20 which is in turn inserted into electronic device 10 with connector 21 coupled to circuit board 12. Hence, the advantageous benefits of the invention are as follows: There is no sacrifice of precious space of electronic device 10 with the additional memory of SD adapted 30 added into electronic device 10. Hence, a slim electronic device 10 is achievable. Further, there is no modification to the current construction of electronic device 10. Futhermore, electronic device 10 is adapted to use both a conventional battery and the battery 20 of the invention. Thus, it enables user selection of the electronic device.

While the invention has been described by means of specific embodiments, numerous modification and variations could be made thereto by those skilled in the art without departing from the scope of the invention set forth in the claims.

What is claimed is:

1. An arrangement for providing a selectable expansion adapter on an electronic device comprising:

a recess on a back of said electronic device, said recess having an opening;

a circuit board in said electronic device having a plurality of terminals projected from said opening; and a battery shaped to be capable of insertion into said recess, said battery comprising a slot for receiving a detachable expansion adapter having a plurality of terminals and a connector extended from inside said slot to project from a surface of said battery;

wherein in a use state said expansion adapter is inserted into said slot with said terminals of said expansion adapter coupled to said connector, and said battery together with said expansion adapter are inserted into said recess with said connector electrically coupled to said terminals of said circuit board, and wherein said connector comprises a plurality of flexible pegs having first ends projected from the surface of said battery, the pegs being inserted into said terminals of said circuit board to be secured therein, and said pegs further having second ends biased by said inserted expansion adapter to be secured to said terminals of said expansion adapter, thereby enabling transmission of signals between said expansion adapter and said electronic device and storage of data in said expansion adapter.

2. The arrangement of claim 1, wherein said electronic device is an intelligent mobile phone.

* * * * *